April 2, 1968    J. McGREGOR GORDON    3,376,049
BICYCLE AND LIKE PROP-STAND
Filed March 18, 1966

INVENTOR:
John McGregor Gordon
BY
Bierman & Bierman

3,376,049
BICYCLE AND LIKE PROP-STAND
John McGregor Gordon, Nuthall, Nottingham, England,
assignor to Raleigh Industries Limited, a corporation
of the United Kingdom
Filed Mar. 18, 1966, Ser. No. 535,386
Claims priority, application Great Britain, July 17, 1965,
30,445/65
8 Claims. (Cl. 280—301)

ABSTRACT OF THE DISCLOSURE

The invention concerns a bicycle or like prop-stand. It consists essentially of a cylindrical housing having an abutment within the bore thereof and a rotatable prop member axially adjustable and supported in said abutment. A cam on said housing and a follower on said prop with means for retaining said prop in operative and inoperative positions.

---

The primary object of the present invention is to provide a simple yet effective prop-stand whereby a bicycle or like vehicle might be supported in a generally upright position when not in use.

According to the present invention a bicycle or like prop-stand comprises a housing formed integrally with or adapted to be applied to a bicycle or like structure, a prop member movably supported in said housing and adjustable between operative and non-operative positions relative thereto, and cooperating location means on or associated with the prop member and housing respectively whereby the prop is maintainable in an operative position as and when desired.

Preferably, the location means comprises a cam member on the one part and a cam follower on the other, the said cam member having a seating in a position thereon corresponding to an operative position of the prop member, and the said cam follower being resiliently loaded into such position.

The invention will now be described further, by way of example only with reference to the drawings filed with the provisional specification which illustrate one embodiment thereof and in which.

Figure 1:
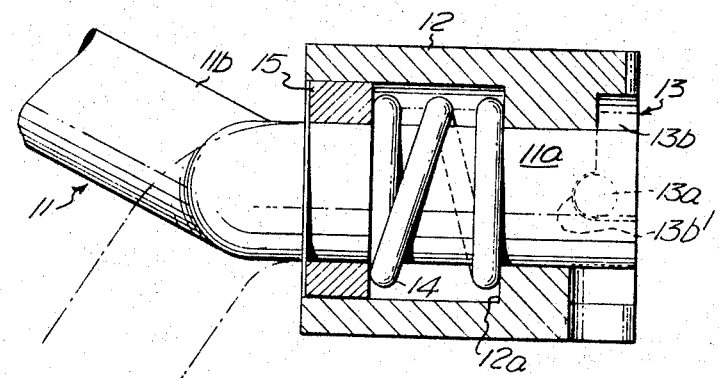
FIG. 1 is a longiutdinal section taken through a bicycle prop-stand.

Referring now to the drawings, a bicycle prop-stand comprises a prop member 11 rotatably mounted in a cylindrical housing 12, cooperating location means 13 on the prop member and housing whereby the said member is positively locatable in operative and non-operative positions relative to the housing, and resilient means 14 acting to resist displacement of the prop member from the operative and non-operative positions as appropriate.

The prop member 11 is of generally Z-shape having an upper region 11a engageable with the housing, in the axial direction thereof, a central region 11b which constitutes the major proportion of the length of the member and which extends from a position adjacent the underside of the bicycle bottom bracket (not shown) to the ground, and a lower region (not shown) of small axial dimensions and which defines a foot arranged to bear against the ground and other support surface. The upper region 11a has a collar 15 secured thereto in spaced disposition relative to the extreme width thereof, the said collar being provided for a purpose hereafter to be made apparent, and immediately adjacent the said extremity the said member presents a radially extending roller pin 13a, the said pin forming a part of the cooperating location means 13.

The remainder of the location means comprises a cam surface 13b formed in one end face of the housing 12, the roller pin moving in contact with the cam surface and controlling the axial position of the prop member relative to the housing accordingly.

The housing 12 has a stepped bore thereto, the extremity of the prop member 11 being located in the lesser diameter bore and having the roller pin 13a passing therethrough, the collar 15 on the said member being disposed within the greater diameter bore and being a clearance fit therein.

The resilient means 14 takes the form of a compression spring disposed about the upper region of the prop member and extending between the collar 15 and the shoulder 12a formed between the two parts of the stepped bore to the housing, such means serving to urge the roller pin into contact with the cam surface.

Figure 2:
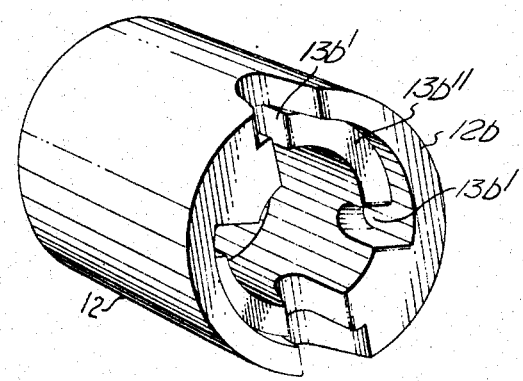
FIG. 2 is a perspective view of the cam surface as applied to the housing shown in FIG. 1.

The cam surface 13b (see now particularly FIG. 2), comprises two identical parts arranged 180 degrees apart and at the end face of the housing, each such part extending over approximately 130° and having two recessed seatings 13b′ separated by a plateau 13b″, which seatings represent the operative and non-operative positions of the prop member relative to the housing. The cam surfaces extend radially outwardly from the inner cylindrical surface of the housing but terminate short of the outer periphery thereof, the resultant flange 12b being cut away to facilitate the initial location of the roller pin with the prop member.

In use, the spring will urge the pin into contact with the surface of the seating with which it is engaged, but will allow of the adjustment of the prop-stand between the operative and non-operative positions thereof, the spring being compressed during such adjustment by the collar moving axially inwardly of the housing, being so moved by the passage of the roller over the plateau.

The invention is not restricted to the exact features of the embodiment described since alternatives will readily present themselves to one skilled in the art.

Thus, for example, instead of providing a housing having a stepped bore, two spaced apart lugs through and between which the prop member passes might be utilised, the spring being disposed between one such lug and an abutment on the said member and the cam surfaces being provided on the face of one such lug, and the expression housing is to be construed accordingly.

What I claim is:

1. A two wheel vehicle prop-stand comprising a cylindrical body part, a stepped bore within and integral with the said body part, a prop member rotatably supported in the housing, a collar on the said prop member and disposed adjacent the outer end of the larger diameter portion of the bore, a coil spring coaxially mounted with the prop member and extending between the said collar and the shoulder formed by the stepped bore, and cooperating location means on or associated with the prop member and housing respectively one of said location means being a cam integral with said housing and shoulder.

2. A vehicle prop-stand comprising a generally cylindrical housing, a bore in the said housing, an abutment within the said bore, a prop member engaged with the said bore, which prop member is rotatably and axially adjustable within the said bore, an abutment on the prop member, a resilient means between two said abutments, cooperating means on the prop-stand and housing adapted positively to locate the prop member in operative or non-operative position as appropriate, which cooperating means includes a cam surface on the one part and a cam follower on the other part, characterized in that said cam surface is provided in axially spaced disposition relative to the end of the housing and the said housing provides shield for said cam radially outwardly of such surface.

3. A prop-stand according to claim 2 including a seat adjacent the end of said cam for reception of said follower, said seat being at a point at about 130 degrees to said operative position.

4. A prop-stand according to claim 3 including a second cam and a second seat diametrically opposite to said first cam and seat.

5. A prop-stand according to claim 4 including a recess-seat at the inner end of said first cam for reception of said prop locating member when in operative position, said seat being at the outer end of said cam for reception of said prop when in inoperative position.

6. A prop-stand as claimed in claim 1 wherein there is a seating on the cam surface in a position thereon corresponding to an operative position of the prop member.

7. A prop-stand as claimed in claim 6 wherein the cam surface is provided on the housing and the cam follower on the prop member.

8. A prop-stand as claimed in claim 7 wherein the abutment on the prop member comprises a collar and wherein the resilient means comprises a helical compression spring disposed about the prop member and extending between the said collar and the housing.

References Cited

UNITED STATES PATENTS 2,157,153   5/1939   Troche _____ 287—103
2,395,148   2/1946   Schwinn _____ 280—301

KENNETH H. BETTS, *Primary Examiner.*